United States Patent
Amerga

(10) Patent No.: US 6,574,483 B1
(45) Date of Patent: Jun. 3, 2003

(54) MODIFIED FINGER ASSIGNMENT ALGORITHM FOR HIGH DATA RATE CALLS

(75) Inventor: Messay Amerga, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 10/252,760

(22) Filed: Sep. 23, 2002

Related U.S. Application Data

(62) Division of application No. 09/398,907, filed on Sep. 15, 1999.

(51) Int. Cl.[7] .............................. H04B 7/00; H04Q 7/20
(52) U.S. Cl. ....................................................... 455/517
(58) Field of Search ................................. 455/517, 509, 455/500, 513, 522, 452, 456, 442; 370/335; 375/146

(56) References Cited

U.S. PATENT DOCUMENTS

| | | | |
|---|---|---|---|
| 5,987,326 A | * 11/1999 | Tiedemann, Jr. et al. ... | 455/442 |
| 6,173,007 B1 | * 1/2001 | Odenwalder et al. ....... | 375/146 |
| 6,229,844 B1 | * 5/2001 | Kong .......................... | 455/456 |
| 6,307,849 B1 | * 10/2001 | Tiedemann, Jr. ............ | 455/522 |

\* cited by examiner

*Primary Examiner*—Thanh Congle
*Assistant Examiner*—Thuan T. Nguyen

(74) *Attorney, Agent, or Firm*—Philip R. Wadsworth; Charles D. Brown; Howard H. Seo

(57) ABSTRACT

A method and communication system for assigning the plurality of fingers to demodulation paths in a path list which insures that at least one finger will be assigned to a demodulation path supporting a supplemental channel, if one exists. The method involves determining whether any of the fingers is demodulating a supplemental channel (112). When no fingers are demodulating supplemental channels, the it is determined whether the sector containing the path under consideration supports supplemental channels (114). If the sector containing the path under consideration supports supplemental channels, then the method determines the strength of the signal path relative to the weakest finger (116). If the path is a certain amount greater in strength then the weakest finger, then the method involves reassigning that finger to the path with the supplemental channel (108) and if the path with the supplemental channel is a certain amount of strength weaker than the weakest finger plus a certain value, then the method involves determining whether the weakest finger is the only one supporting the supplemental channel (118). If the weakest finger is the only one supporting supplemental channels, and the sector supports supplemental channels (120), then that finger is assigned to the demodulation path with the supplemental channel (108), thus insuring that the information on a supplemental channel is always demodulated by a finger during a soft-handoff in a high data rate call. If one or more fingers are already demodulating supplemental channels, then the finger assignment algorithm will proceed in the conventional way.

3 Claims, 6 Drawing Sheets

MODIFIED FINGER ASSIGNMENT ALGORITHM FOR HIGH DATA RATE CALLS

RELATED APPLICATIONS

This application is a divisional of application Ser. No. 09/398,907 filed Sep. 15, 1999.

BACKGROUND OF THE INVENTION

1. Field of the Invention

The present invention relates to communications systems, particularly to an improved finger assignment method for high data rate ("HDR") calls in a communication system capable of receiving multiple signals.

2. Description of the Related Art

The next generation of wireless networks will provide multiple services requiring high data rate transmission and uninterrupted connections. This next generation is often referred to as the "third generation" of CDMA wireless systems. The range of services include text paging, two-way radio connections, internet connectivity using microbrowsers, two-way wireless e-mail capability and wireless modem functionality. The CDMA cellular telephone system offers the capability to provide reliable radio links between a wireless communications device such as a mobile station ("MS") and a base station ("BS") with a much higher data capacity than conventional networks that only support voice service. As an example, in the third generation CDMA wireless systems, radio links supporting high rate (up to 2 Mbps) data transmissions will be established between the MS and the BS to provide multimedia services such as Internet access.

One particularly important feature of CDMA systems for effective third generation wireless communication is the soft handoff, which allows the MS to move smoothly from the coverage of one cell to another without interruption of service to the user. The soft handoff is accomplished by establishing simultaneous communications between the MS and multiple base stations or BS sectors. In a soft handoff, a MS passes to the edge of the coverage area of a serving BS into a new coverage area of a receiving BS. Momentarily, both BS sectors simultaneously communicate with the MS. As the MS passes further into the coverage area of the receiving BS, the server BS stops communicating with the MS. In this manner, there is uninterrupted communication for the user of the MS as the he or she passes from the server cell to the receiving cell. An efficient soft handoff algorithm plays an important role in maintaining the link quality as well as conserving the capacity-related network resources. As the demand to support high rate data services increases, the need to improve the efficiency of the handoff algorithm becomes more critical.

For a third generation system based on CDMA technologies, a highly efficient handoff algorithm is essential to successfully provide the infrastructure to support the new range of services. A conventional protocol for soft handoffs in a CDMA system has been adopted by the Telecommunications Industry Association in the industry standards IS-95, IS-95 A or IS-95 B (collectively "IS-95 A/B") for implementing a CDMA cellular system. A new feature in the IS-95 B standard not found in IS-95 A is the inclusion of Supplemental Code Channels, or Supplemental Channels within the Traffic Channels. The Traffic Channels are the communication path between the MS and the BS used for user voice and signaling traffic. The term Traffic Channel includes the forward channel from the BS to the MS and the reverse channel from the MS to the BS.

In a code division multiple access (CDMA) cellular telephone system, a common frequency band is used for communication with all base stations in a system. The common frequency band allows simultaneous communication between a mobile station and more than one BS. Signals occupying the common frequency band are discriminated at the receiving station through the spread spectrum CDMA waveform properties based on the use of a high speed pseudonoise (PN) code. The high speed PN code is used to modulate signals transmitted from the base stations and the mobile stations. Transmitter stations using different PN codes or PN codes that are offset in time produce signals that can be separately received at the receiving station. The high speed PN modulation also allows the receiving station to receive a signal from a single transmitting station where the signal has traveled over several distinct propagation paths.

A signal having traveled several distinct propagation paths is generated by the multipath characteristics of the cellular channel. One characteristic of a multipath channel is the time spread introduced in a signal that is transmitted through the channel. For example, if an ideal impulse is transmitted over a multipath channel, the received signal appears as a stream of pulses. Another characteristic of the multipath channel is that each path through the channel may cause a different attenuation factor. For example, if an ideal impulse is transmitted over a multipath channel, each pulse of the received stream of pulses generally has a different signal strength than other received pulses. Yet another characteristic of the multipath channel is that each path through the channel may cause a different phase on the signal. For example, if an ideal impulse is transmitted over a multipath channel, each pulse of the received stream of pulses generally has a different phase than other received pulses.

In the mobile radio channel, the multipath is created by reflection of the signal from obstacles in the environment, such as buildings, trees, cars and people. In general the mobile radio channel is a time varying multipath channel due to the relative motion of the structures that create the multipath. Therefore, if an ideal impulse is transmitted over the time varying multipath channel, the received stream of pulses would change in time location, attenuation, and phase as a function of the time that the ideal impulse was transmitted.

The multipath characteristic of a channel can result in signal fading. Fading is the result of the phasing characteristics of the multipath channel. A fade occurs when multipath vectors are added destructively, yielding a received signal that is smaller than either individual vector. For example if a sine wave is transmitted through a multipath channel having two paths where the first path has an attenuation factor of X dB, a time delay of $\delta$ with a phase shift of $\Theta$ radians, and the second path has an attenuation factor of X dB, a time delay of $\delta$ with a phase shift of $\Theta+\Pi$ radians, no signal would be received at the output of the channel.

In narrow band modulation systems such as the analog FM modulation employed by conventional radio telephone systems, the existence of multiple paths in the radio channel results in severe multipath fading. As noted above with a wideband CDMA, however, the different paths may be discriminated in the demodulation process. This discrimination not only greatly reduces the severity of multipath fading but provides an advantage to the CDMA system.

The deleterious effects of fading can be mitigated by controlling transmitter power in the CDMA system. A system for BS and MS power control is disclosed in U.S. Pat. No. 5,056,109 entitled "METHOD AND APPARATUS FOR CONTROLLING TRANSMISSION POWER IN A CDMA CELLULAR MOBILE TELEPHONE SYSTEM," issued Oct. 8, 1991, assigned to the Assignee of the present invention. Furthermore the effect of multipath fading can be reduced by communication with multiple base stations using a soft handoff process. A handoff process is disclosed in U.S. Pat. No. 5,101,501 entitled "SOFT HANDOFF IN A CDMA CELLULAR TELEPHONE SYSTEM," issued Oct. 8, 1991, and assigned to the Assignee of the present invention. The disclosure of U.S. Pat. Nos. 5,056,109 and 5,101,501 are incorporated herein by reference.

A method of assigning multiple demodulation elements or fingers in a spread spectrum system is disclosed in U.S. Pat. No. 5,490,165 ("the '165 patent"), which disclosure is incorporated as if fully set forth herein. Accordingly, background information and familiarity with the '165 patent are presumed for the present invention. The '165 patent is assigned to the Assignee of the present invention.

In the '165 patent, the MS using a searcher element scans a window of time offsets around the nominal arrive time of each signal of each BS with which active communication is established. The set of base stations having active communication with the MS is called the Active Set. Each scan produces a survey yielding a list of survey paths that comprises pilot signal strength, time offsets, and corresponding BS pilot offset. The survey paths have corresponding data such as the arrival time, signal strength, and transmitter index for each signal. The searcher element passes the information to a controller. The controller tries to match the time offset of each survey path to the time offset of paths currently being demodulated by the fingers. If there are multiple demodulation paths that match one survey path, all fingers or demodulation elements assigned to that path, except the demodulation element having the strongest signal strength indication, are labeled "free." If a demodulation path exists that does not correspond to a survey path, a survey path entry based on the demodulation path information is added to the list of survey paths.

Next the controller considers the survey paths in order of signal strength with the strongest signal strength survey path being first. If there is no demodulation element assigned to any path in the corresponding sector of the survey path under consideration, the controller attempts to assign a demodulation element to the survey path in the following order. If there is an unassigned or labeled "free" demodulation element, the demodulation element is assigned to the survey path. If no demodulation element is free, the demodulation element having the weakest path that is not the only demodulation path from its BS sector, if any, is re-assigned to the survey path. Finally if the first two cases fail to assign a demodulation element to the survey path, a demodulation element assigned to the weakest path is reassigned to the survey path if the survey path's signal strength is stronger than the signal strength of the weakest demodulation path. This process continues until one re-assignment occurs or until the last criteria fails to re-assign a demodulation element to the survey path under consideration.

If none of the above rules re-assign a demodulation element for the present survey path, the controller considers the survey paths again in order of signal strength with the strongest signal strength survey path being first. If the survey path is not currently assigned to a demodulation element, the controller may assign any unassigned or labeled "free" demodulation element to the survey path under consideration. If there are no unassigned or labeled "free" demodulation elements, the controller may also re-assign a demodulation element that is assigned to the same BS sector as a survey path if the survey path is stronger than the demodulation path. The controller may also re-assign the weakest demodulation element that is assigned to any BS sector having two or more assigned demodulation elements if the survey path is stronger than the demodulation path. Once either of the two above rules causes a re-assignment or both of the above rules for re-assignment fail for the survey path under consideration, the process begins again with a new scan.

The '165 patent uses these steps to ensure BS and sector diversity. Each time a demodulation element or finger is re-assigned, a finite time lapses in which no data is demodulated. Therefore, the prior art to the '165 patent limnited the number of demodulation element re-assignments per survey. Comparison ratios are used to create hysteresis in the assignments and thus reduce excessive re-assignment of demodulation elements.

The BS uses a similar but less complicated method to assign the demodulation elements. Because each BS sector receives the same information from a single MS, there is no need to sacrifice the maximum signal level paths to promote diversity. Thus the BS method is based more strictly on signal level while limiting the number of re-assignments per survey similar to the MS method. The BS also uses ratios similar to the mobile station to create hysteresis to reduce excessive re-assignment of demodulation elements Under the current IS-95 B specifications, a MS may have up to six sectors in its Active Set. The MS may be receiving data at a higher rate on any or all of these sectors. Due to hardware limitations, however, a MS may not have enough demodulating fingers to track all the paths it detects. Therefore, a MS in a soft handoff during a higher data rate call may ignore base stations transmitting on Supplemental Channels under the finger assignment algorithm as disclosed in the '165 patent.

The Supplemental Channel is an optional portion of a forward or reverse Traffic Channel, which operates in conjunction with a Fundamental Code Channel in the Traffic Channel and optionally with other Supplemental Channels to provide higher data rate services. The Fundamental Code Channel is also a portion of the forward or reverse Traffic Channel which carries a combination of primary data, secondary data, signaling and power control information defined and organized according to the IS-95 B industry standard. The Supplementary Channel transmits a combination of primary data, secondary data, or both, but never signaling formation.

The '165 patent relates to "voice only" systems and therefore does not teach tracking the Supplemental Channels which may be providing supplemental data to the MS separate from a Traffic Channel used for a voice conversation. By not tracking a Supplemental Code Channel, data may be lost when the communication path is temporarily severed during a soft handoff, or when a four way handoff occurs. The following example demonstrates the problem.

FIG. 2 illustrates a four-way soft handoff where the MS has three fingers available to track paths. Base stations A, B, C, and D are all in the Active Sector of the MS on a HDR call. The finger assignment algorithm will select the strongest paths from base stations A, B and C to match up with the fingers since those are the cells indicating the strongest signals. If BS D is the only station transmitting a Supplemental Channel, then the MS will not be demodulating the Supplemental Channel, resulting in an radio link protocol (RLP) resynchronization at the MS.

Data may also be lost or an interruption of communication may occur if the MS is in a handoff and the MS has Y fingers available to track paths, and the BS sectors that are transmitting supplemental channels are the $(Y+1)^{th}$ to last strongest pilots received by the MS. In other words, if the MS has for example 4 fingers available to track paths and the base stations transmitting on supplemental channels is the $5^{th}$ strongest pilot received by the MS, then the supplemental channel will not be demodulated and the information will not be communicated to the MS under the method taught in the '165 patent.

SUMMARY OF THE INVENTION

In order to address the problem of possibly losing supplemental channels in a soft handoff, the invention disclosed herein is proposed. The present invention insures that at least one finger will be assigned to a cell that is transmitting supplementals, if one exists. If one or more fingers are already demodulating supplemental channels, then the finger assignment algorithm will proceed normally. The present invention provides an improved finger assignment algorithm to that shown in FIGS. 5A–5D of the '165 patent.

Throughout the disclosure, the use of the terms 'demodulation element' and 'finger' are used interchangeably.

According to the present invention, a communication system comprises at least one base station, a mobile station transmitting and receiving communications signals to and from the at least one base station, a control system which assigns fingers to demodulate communication signals received by the mobile station, the control system determining after all the fingers have been assigned to demodulate communication signals whether any of the fingers are demodulating communication signals on supplemental channels. The control system reassigns a finger to demodulate a supplemental channel if no fingers assigned are presently demodulating communication signals on the supplemental channel. One of ordinary skill in the art will understand the necessary implementation of the above structure.

The present invention is also directed to a method of assigning the plurality of fingers to insure that at least one finger will be assigned to a cell or sector that is transmitting on a supplemental channel, if one exists. The method involves the mobile station or receiver having a plurality of fingers or demodulation elements, and assigning the plurality of fingers to a plurality of signals from the base station or base stations. The method comprises measuring the plurality of signals from the base stations beginning with the strongest to the weakest, creating electronic representations of a list of survey paths of each of the plurality of signals, matching a list of demodulation paths corresponding to signals being demodulated by the mobile station to the list of survey paths, determining whether each of the plurality of fingers is matched to one of the plurality of signals, and determining whether any of the fingers is demodulating a supplemental channel. When no fingers are demodulating supplemental channels, the method further comprises determining whether the cell containing the demodulation path being demodulated by the finger supports supplemental channels. If the cell containing the demodulation path being demodulated supports supplemental channels, then the method determines whether the strength of the demodulation path being demodulated is a certain amount greater in strength than the weakest finger, and if yes, the method reassigns that weakest finger to the demodulation path from the cell supporting the supplemental channel. If the strength of the demodulation path with the supplemental channel is not a certain amount greater than the weakest finger, the method begins a new scan of the survey paths beginning with the strongest path.

When there are fingers already demodulating supplemental channels, the method inquires whether the strength of weakest finger is at least 3 dB weaker than the strength of the demodulation path. If yes, the method determines whether the weakest finger is the only one supporting the supplemental channel. If no, then the method reassigns that finger to the demodulation path. If yes, then the method asks whether the sector containing that demodulation path supports supplemental channels. If yes, then the method reassigns that finger to the demodulation path. If no, the sector does not support supplemental channels, then the method asks whether the call is a high data rate call with supplemental channels and fingers not demodulating supplemental channels. If the strength of the weakest finger is 3 dB or less weaker than the demodulation path, the method also determines the same question above, namely, whether the call is a high data rate call with supplemental channels and fingers not demodulating supplemental channels.

In both cases above where the query is whether the call is a high data rate call with supplemental channels and fingers not demodulating supplemental channels, if yes, then the method determines whether there are more paths on the path list. If there are more paths on the path list, the next strongest path on the list is assigned as the demodulation path under consideration and the method continues again as described above. If no, there are no most paths on the path list, then the method continues to assign fingers for path diversity. If the HDR call with supplemental data is being demodulated by a finger, then the method continues to assign fingers for path diversity.

Therefore, if the weakest finger is the only one supporting supplemental channels, and the cell supports supplemental channels, then that finger is assigned to the survey path P with the supplemental channel, although that path P may normally not be assigned a finger because it is the $4^{th}$ strongest survey path where the mobile station has only 3 fingers or demodulation elements, as an example. In this manner, the present invention insures that the information on a supplemental channel is always demodulated by a demodulation element during a soft-handoff in a high data rate call.

BRIEF DESCRIPTION OF THE DRAWINGS

The features, objects, and advantages of the present invention will become more apparent from the detailed description set forth below when taken in conjunction with the drawings in which like reference characters correspond throughout and wherein.

DETAILED DESCRIPTION OF THE INVENTION

FIGS. 1A–1D illustrate the improved finger assignment algorithm according to the present invention over the teachings of the '165 patent. In FIGS. 1A–1D; it is assumed that there are three demodulation elements or fingers available for assignment. A control system for operating the algorithm and methods illustrated by the flow charts is not shown. Such control system may be deployed in the MS, the BS or both. Implementing the method and algorithm disclosed and claimed herein by a control system would be understood by one of ordinary skill in the art.

Many other embodiments of the present invention will be readily apparent upon considering the implementation of FIGS. 1A–1D. For example, the number of demodulation elements may be more or less than three. Therefore FIGS. 1A–1D are not meant to limit the present invention but are meant to serve as a preferred embodiment.

Figure 1A:
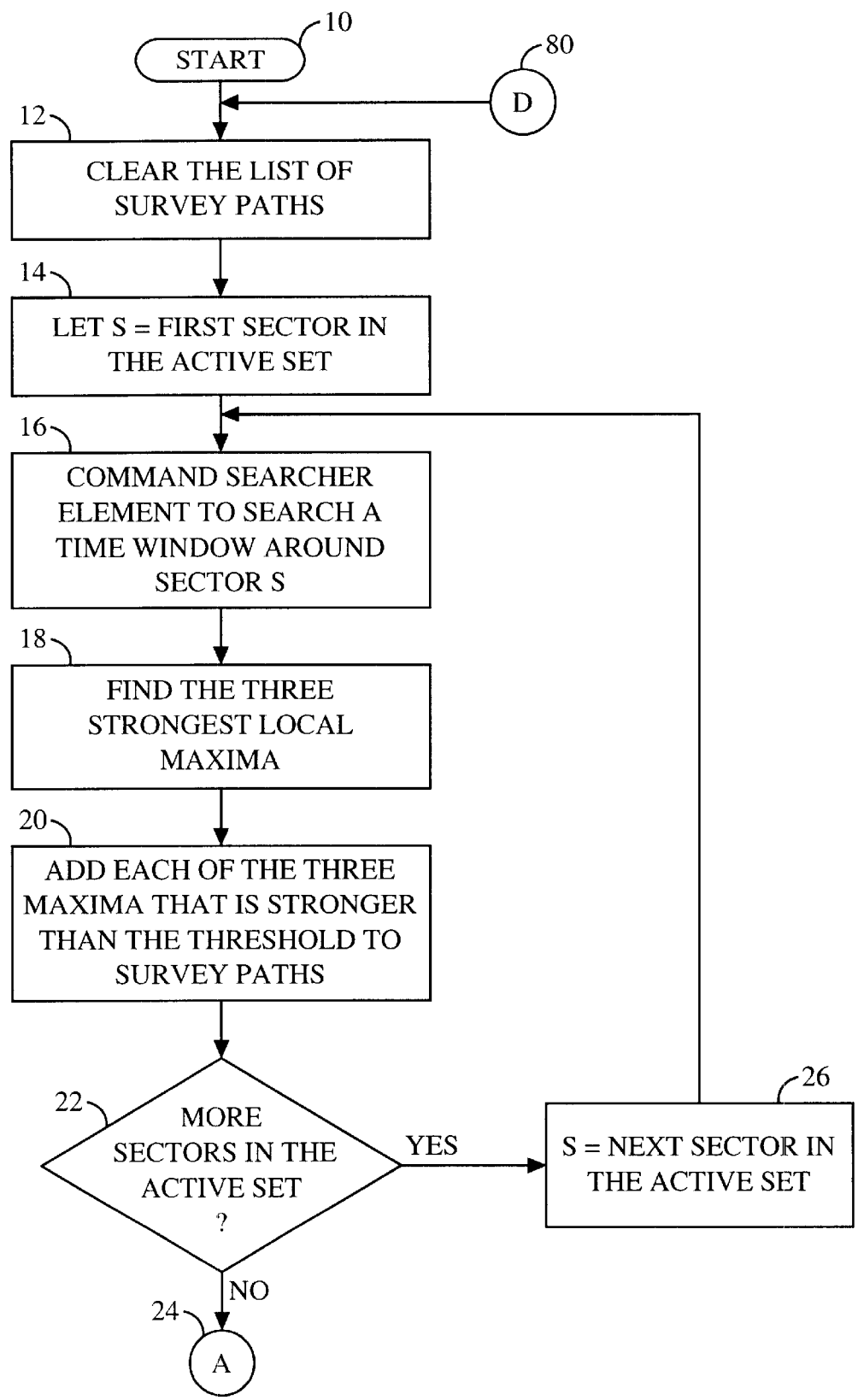
FIGS. 1A–1D are a detailed example of the demodulation element assignment method for a mobile station according to the present invention.

FIG. 1A begins the cycle. The method begins (block 10) by clearing the list of survey paths (block 12) found on the last cycle (block 80). A first BS sector with which communication is established is set as the first sector under consideration for the searching process (block 14). The searcher element searches a window of time around the expected arrival time of signals from the sector under consideration (block 16). The three strongest local maxima from the search of the sector under consideration are determined (block 18). In this example, finding more than the three strongest is ineffectual because only three demodulation elements are available for assignment and in no case would a demodulation element be assigned to the fourth largest survey path from a single BS sector.

In the exemplary embodiment, a local maximum is found within the search window based on the use of survey samples that are spaced 0.5 chips apart in time. If a smaller survey sample resolution is used, a single signal path would likely create more than one distinct peak. In such a system, the distinct peaks could be used to create a single local maximum for the purposes of demodulation element assignment.

Each of the three maxima that has a signal strength that is stronger than a threshold value are added to the survey paths (block 20). If there are more sectors in the active set (block 22), the next sector in the active set is set for consideration (block 26) and the method continues to search a time winder around the new sector under consideration (block 16) and the method proceeds as discussed above. If the sector under consideration is the last sector to be searched, the survey list is complete (block 22).

Figure 1B:
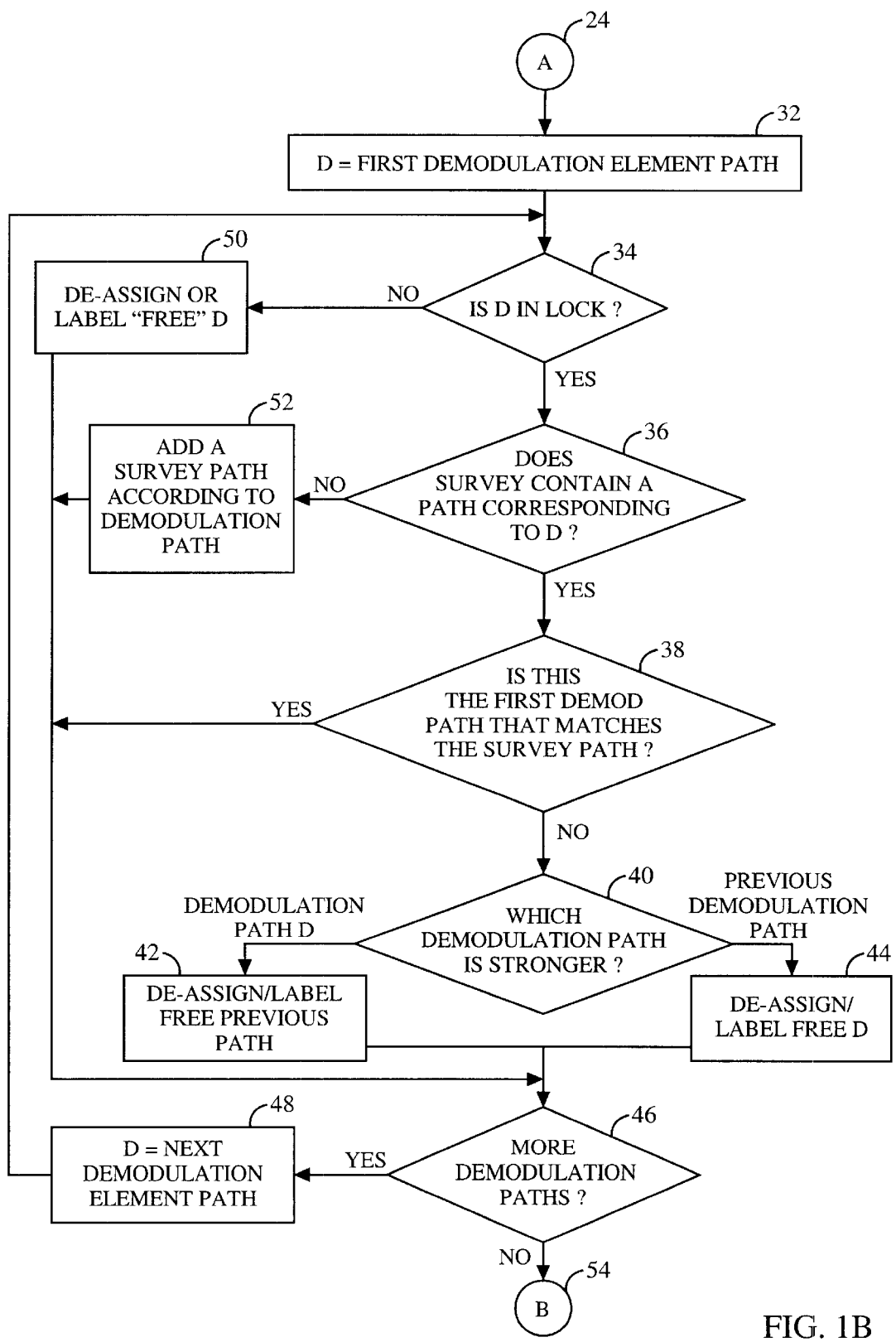

Having attained the set of survey paths, the method continues in FIG. 1B (connecting block 24). The demodulation path under consideration is set to "D" (block 32). The lock/unlock state of the demodulation element corresponding to the demodulation path under consideration is checked (block 34). If the demodulation element is unlocked the controller may de-assign the demodulation element or it may label the demodulation element "free" (block 50). In such a case no valid data exists to match to the survey paths. Action corresponding to the demodulation path under consideration is complete and the method continues to determine whether there are more demodulation paths (block 46). If yes, then "D" is set as the next demodulation path (block 48) and it is determined whether D is in lock as outlined above (block 34).

If the demodulation element under consideration is currently in lock (block 34), the method attempts to match the time offset of the demodulation path to the analogous information in the list of survey paths (block 36). In general, each demodulation path matches with at least one survey path. In other words, if a path from a BS is strong enough to be demodulated, it should be detectable by the searcher element. On occasion, the searcher element may miss a path and therefore not enter a survey path corresponding to a demodulation path on the survey path list. The demodulation element more accurately estimates the signal level and time offset of a path than the searcher element. Therefore the method assumes that the demodulation element is accurate and that such a path does exist. Therefore if there is no survey path entry for a demodulation path, a survey path entry corresponding to the demodulation path is created (block 52). Action corresponding to the demodulation path under consideration is complete and the method determines whether there are more demodulation paths for consideration (block 46). If yes, "D" is assigned as the next demodulation element path (block 48) and the method continues as outlined above to determine whether D is in lock and so forth (block 34).

If a survey path exists that corresponds to the demodulation path under consideration, the method determines whether the demodulation path under consideration is the first demodulation path to match the particular survey path (block 38). If the demodulation path under consideration is the first, action corresponding to the demodulation path under consideration is complete and the method determines whether there are more demodulation paths for consideration as set forth above (block 46).

If the demodulation path under consideration is not the first demodulation path to match the particular survey path, two demodulation elements are demodulating substantially the same path. This scenario can be a common occurrence. Each demodulation element tracks the signal to which it was originally assigned. Commonly two multipath signals over time merge into one path or nearly the same path. Block 38 identifies such a situation. If the demodulation path under consideration is not the first demodulation path to match a particular survey path, then it is determined which demodulation path has the stronger signal level (block 40). If the demodulation element under consideration has the stronger signal level, the previous demodulation element having a path matching this same survey path is de-assign or labeled free (block 42). If the demodulation element under consideration is weaker than the previous path, the demodulation element corresponding to the demodulation path under consideration is de-assigned or labeled free (block 44). Action corresponding to the demodulation path under consideration is complete.

If a demodulation path exists that has not yet been considered (block 46), the next demodulation path under consideration is selected (block 48) and the process is repeated for that demodulation path (block 34, etc.). If the demodulation path under consideration is the last demodulation path to be considered, then the method of assigning finger assignment to assure cell diversity begins (block 54).

Figure 1C:
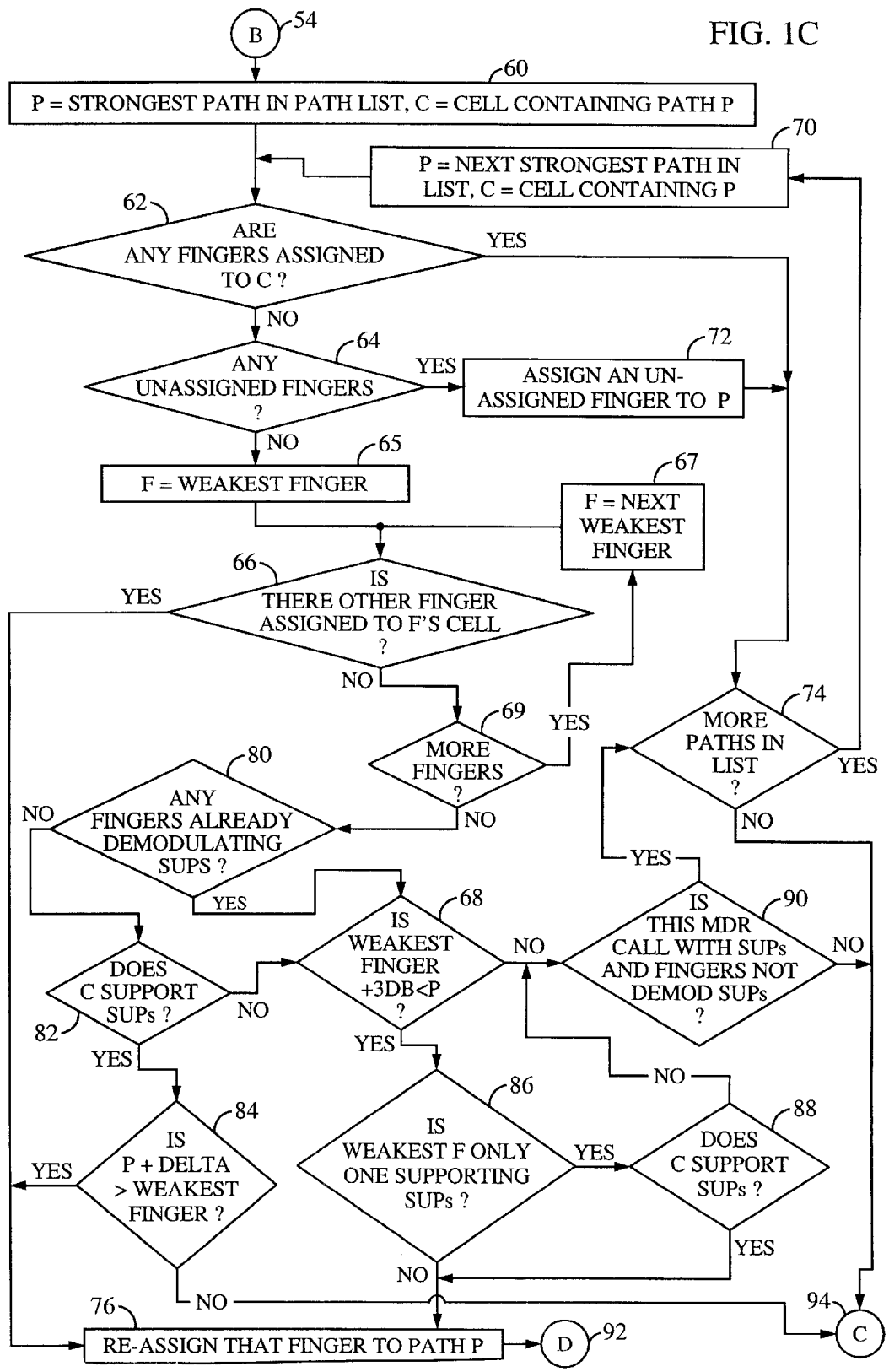

Having attained the set of survey paths and matched the demodulation paths to the survey paths, the method continues to FIG. 1C (block 54). The survey path with the strongest signal level is taken under consideration and set as "P" (block 60). The cell containing P is set to "C" and the sector containing P is set as "S" (block 60).

The algorithm of FIG. 1C focuses on covering as many cells as possible to insure that at least one finger is demodulating a path which supports supplemental channels. However as discussed above, an alternate implementation of the present invention could emphasize BS diversity independent of sectors.

Figure 1D:
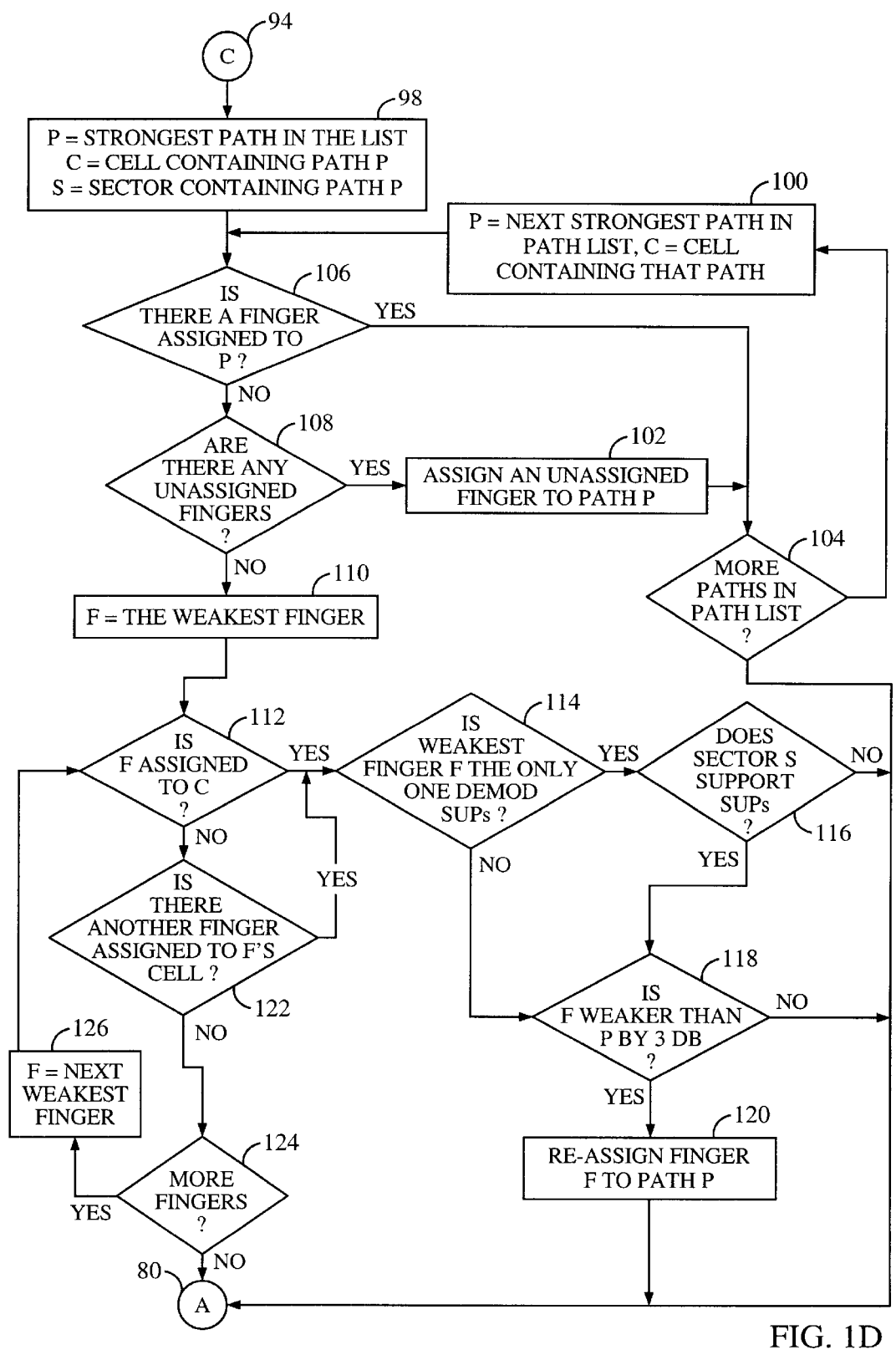
Figure 2:
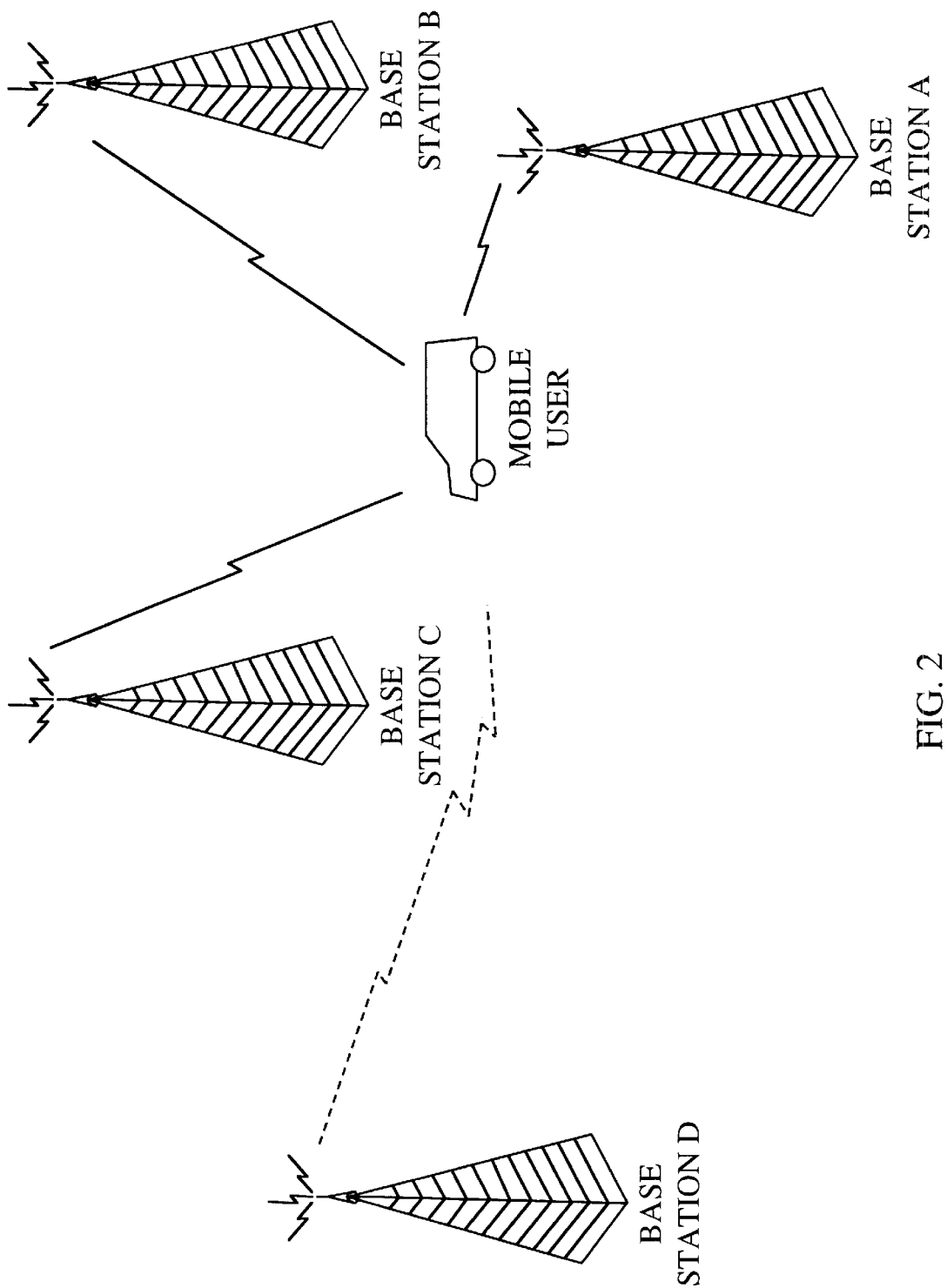
FIG. 2 illustrates a four-way hand-off situation.

The algorithm begins by assigning the fingers to the strongest paths in the survey list. If a demodulation element is assigned to the cell C under consideration (block 62), and then if more paths are on the path list (block 74), the method will cycle through the paths on the path list beginning with the strongest to the weakest (blocks 62, 74, 70) until a cell containing a survey path is found which doesn't have any fingers assigned to it (block 62). If the survey path under consideration is the last survey path to be considered, and the fingers are all assigned to cells (block 62), then a finger assignment to accomplish path diversity begins (block 94) as shown in FIG. 1D.

If no finger exists having a demodulation path corresponding to the survey path under consideration, and if any fingers are unassigned (block 64), the unassigned finger is assigned to that path (block 72). Then if there are more paths in the path list (block 74), the "P" is assigned as the next strongest path in the path list for consideration (block 70) and the cycle continues (block 62). After all the fingers have been assigned (block 64), then the method begins a process of insuring that there are not more than one fingers demodulating each cell. The weakest finger "F" (block 65) is first evaluated to determine whether to reassign a finger. If there is another finger assigned to the weakest finger's cell (block 66), then the other finger is reassigned to the path under consideration (76) and the cycle begins again at FIG. 1A.

If there are no other fingers assigned to the weakest finger F's cell (block 66), and there are more fingers (block 69), "F" is assigned as the next weakest finger (block 67) and it is determined whether there are any other fingers assigned to F's cell (block 66), and so forth as described above. In this manner, the method insures that each cell only has a single finger demodulating it.

If there are no double assignments of fingers to cells (block 66) and there are no more fingers (block 69), it is determined whether any of the fingers are already demodulating a supplemental channel (block 80). If there are not any fingers already demodulating a supplemental channel, it is determined whether the sector "S" containing the path P supports supplemental channels (block 82). If fingers are already demodulating a supplemental channel or channels (block 80), then it is determined whether the signal level of the demodulation path for comparison is more than 3 dB weaker than the signal level of the survey path under consideration (block 68). The 3 dB data is the hysteresis window to prevent excessive re-assignment between two similarly advantageous paths. Larger or smaller hysteresis windows could be used depending on the system application.

If the weakest finger is at least 3 dB weaker than the survey path, then it is determined whether the weakest finger F is the only one supporting supplemental channels (block 86).

Returning to block 80, if there are no fingers already supporting supplemental channels, it is determined whether the sector S containing the path under consideration supports supplemental channels (block 82). If the cell does not support supplemental channels, it is determined whether the weakest finger is at least 3 dB less than P (block 68), as discussed above. If the cell does support supplemental channels (block 82), then it is determined whether the strongest path P plus a differential amount delta is greater than the weakest finger (block 84). If yes, then the finger corresponding to the demodulation path for comparison is re-assigned to the survey path under consideration (block 76). This re-assignment is the sole re-assignment for this cycle and the cycle beings over at FIG. 1A (block 92). The assignment involves assigning an unassigned finger, of one exists, to the particular survey path having a corresponding transmitter index that is different from every other transmitter index in the list of demodulation paths. The assignment of the un-assigned finger depends on whether a finger is demodulating information on a Supplemental Channel to insure that at least one finger is assigned to a transmitter that is transmitting on Supplemental Channels.

Returning to block 84, if the path P plus a differential amount is not greater than the weakest finger, then the reassignment of block 76 is bypassed and the finger reassignment algorithm for maximizing cell diversity as shown in FIG. 1D is executed (block 94). The value of delta can be manipulated to choose the threshold of when to reassign the finger to the path P when that sector S supports supplemental channels but no fingers are presently demodulating supplemental channels. Delta may be between +/−20 dB or more.

Continuing at block 68, if the signal level of the weakest finger used for comparison is greater than 3 dB weaker than the signal level of the survey path under consideration, then it is determined whether the weakest finger is the only one supporting supplemental channels (block 86). If yes, then it is determined whether the sector containing the path P under consideration supports supplemental channels (block 88). If no, then that finger is reassigned to the path P (block 76) and the cycle begins again in FIG. 1A (block 92). In this case, although there is no finger supporting supplemental channels, the sector containing the path P supports supplemental channels and if data begins to be transmitted on the supplemental channel, the sector already has a path being demodulated to handle the data.

If the weakest finger is the only one supporting supplemental channels (block 86), and if the sector does support supplemental channels (block 88), then the process proceeds to reassign that finger to the path P under consideration (block 76) and the cycle begins again (block 92).

Returning to block 86, if the finger with the weakest signal level is not the only one supporting supplemental channels, then the cycle proceeds to block 76 and that finger which corresponds to the demodulation path for comparison is re-assigned to the path P under consideration (block 76), following which the cycle beings over at FIG. 1A (block 92). In this manner, if more than one finger is supporting supplemental channels, the strongest finger will be reassigned to the path P. Returning to block 88, if the sector containing the path P under consideration does not support supplemental channels, then it is determined whether the high data rate call uses supplemental channels and whether there are any fingers not demodulating supplemental channels (block 90). If there are more fingers which are not demodulating supplemental channels, and the call is a HDR call with supplemental information, then there must be more paths on the survey list which have not been considered. Therefore, the method returns to continue to survey the paths on the path list (block 74) and the process proceeds as above. Block 90 insures that the survey list of paths is exhausted to take advantage of every opportunity to assign fingers to supplemental channels. If there are fingers demodulating supplemental channels (block 90), then there is no need to reassign or to continue to test the survey path list and the finger reassignment algorithm for maximizing sector and path diversity as shown in FIG. 1D is executed (block 94).

The benefit of this procedure is that at least one finger is assigned to a cell that is transmitting on supplemental channels, if supplemental data is being transmitted on supplemental channel. The method of FIGS 1A–1D first maximizes cell diversity in FIG. 1C and then focuses on sector and path diversity in FIG. 1D to insure that supplemental channels are always demodulated.

Turning to FIG. 1D, the strongest path in the path list is set as "P" and the cell containing P is set as "C", and the sector containing P is set as "S" (block 98). To maximize sector diversity, it is determined whether a finger is assigned to demodulate the path P (block 106). If yes, the method determines whether there are any more paths on the path list (block 104). If there is no finger assigned to P, it is determined whether any finger is free or unassigned (block 108). If an unassigned or free finger exists, the unassigned or free finger is assigned to P (block 102) and action corresponding to the survey path under consideration is complete and it is determined whether there are more paths on the path list (block 104).

From block 104, if there are more paths on the path list, the process continues for the next strongest survey path, which is assigned as "P" and assigns "C" as the cell containing P (block 100). If an additional survey path does not exist, the flow continues through connection block 80 to FIG. 1A to clear the list of survey paths and being the cycle again (block 12).

Returning to block 108, after the strongest paths are assigned fingers and there are no fingers remaining, then the algorithm insures that any data on supplemental channels will be demodulated. The weakest finger is assigned as "F" (block 110). It is then determined whether the weakest finger F is assigned to cell C (block 112). If yes, then it is determined whether the weakest finger F is the only one demodulating Supplemental Channels (block 114). Blocks 114 and 116 insure that a finger is not removed that is the only one demodulating supplemental channels.

If finger F is the only one demodulating the cell C, it is determined whether the sector containing the path P under consideration supports Supplemental Channels (block 116). If sector S does not support supplemental channels, then the algorithm does not reassign fingers but keeps the finger F as the sole demodulating finger of the Supplemental Channel. The method begins again (block 80) to clear the list of survey paths (block 12) as shown in FIG. 1A.

If the sector S supports Supplemental Channels (block 116), then the finger F being considered is not the only one demodulating Supplemental Channels. It is determined whether the finger F is weaker than P by 3 dB (block 118). The value 3 dB is used by example, but a range of +/−20 dB or more may be used to vary the output of block 118 as to whether a finger gets reassigned in block 120. If F is weaker than P by 3 dB, then the finger F is reassigned to the path P (block 120) and the list of survey paths is cleared (blocks 80, 12). If finger F is not weaker than P by 3 dB, than the reassignment does not occur and the list of survey paths is cleared (block 80, 12).

Returning to block 112 of FIG. 1D, if the weakest finger F is not assigned to the cell containing the path P, then it is determined whether there is another finger assigned to F's cell (block 122). If yes, the method proceeds to block 114 and continues as described above. If no, then it is determined whether there are any more fingers (block 124). If there are no more fingers, then the list of survey paths is cleared and the cycle begins again (blocks 80, 12). If there are more fingers as determined by block 124, then the finger "F" is assigned as the next weakest finger (block 126), and continues with the determination of whether F is assigned to the cell containing the path P (block 112) and so forth as described above from block 112.

In block 118, the 3 dB offset is the hysteresis window to prevent excessive re-assignment between two similarly advantageous paths. Larger or smaller hysteresis windows could be used depending on the system application. If such a 3 dB weaker path exists, the finger corresponding to the weakest such demodulation path is reassigned to the survey path (block 120). This re-assignment is the sole re-assignment for this cycle and the flow continues though connection block 80 to the beginning of a new cycle on FIG. 1A. The assignment involves assigning an unassigned finger, of one exists, to the particular survey path having a corresponding transmitter index that is different from every other transmitter index in the list of demodulation paths. The assignment of the un-assigned finger depends on whether a finger is demodulating information on a Supplemental Channel to insure that at least one finger is assigned to a transmitter that is transmitting on Supplemental Channels.

If no such 3 dB weaker path exists, the remaining survey paths would flow through FIG. 1D in the same manner as the demodulation path under consideration. Therefore if no such path exists, meaning that no re-assignments have occurred during this cycle, flow continues from block 120 through connection block 80 to FIG. 1A.

Figure 3A:
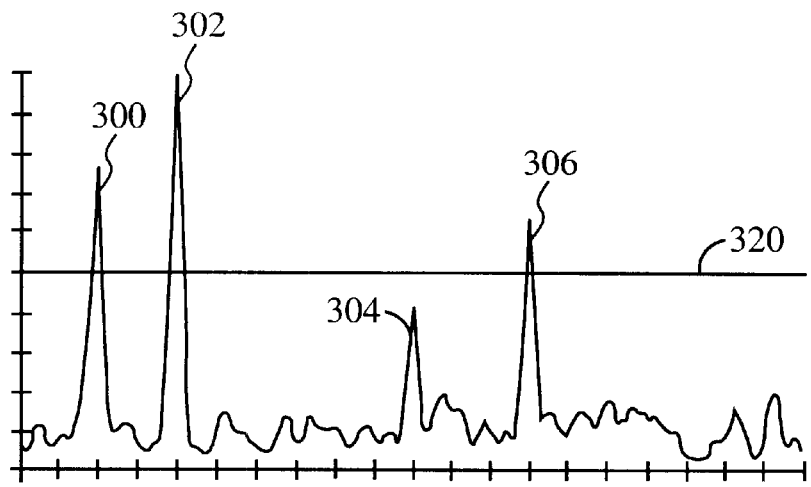
FIGS. 3A–3C illustrate the pilot signal strength versus time for three different base stations or base sectors.
Figure 3B:
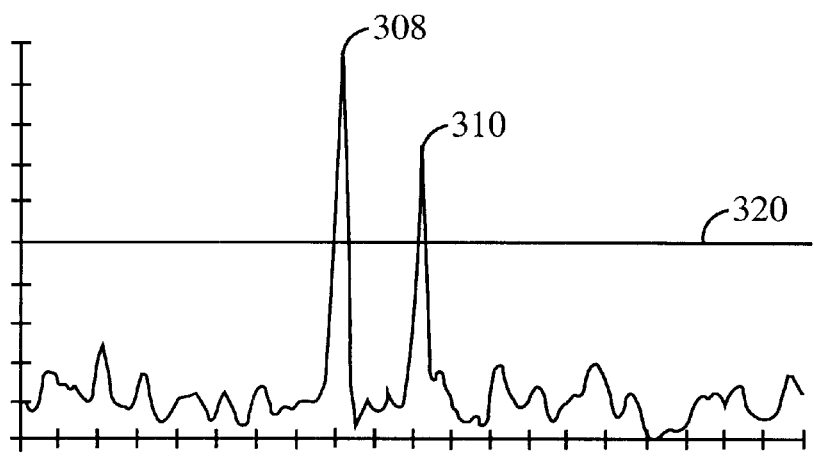
Figure 3C:
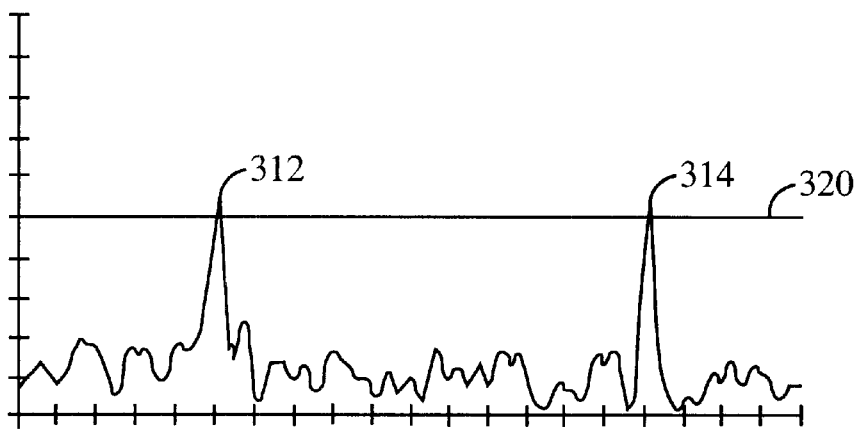

By way of example let us assume that the method of FIGS. 1A–1D is executed based on the signals shown in FIGS. 3A–3C. Assume that no other BS sectors are available to the mobile station. Assume that the three demodulation elements are assigned as follows:

| Demod. Element | Time offset | Signal Level | Locked | Sector |
| --- | --- | --- | --- | --- |
| 1 | $t_1$ | $A_1$ | Y | 3A |
| 2 | $t_2$ | $A_2$ | N | 3A |
| 3 | $t_3$ | $A_3$ | Y | 3A | where the sector corresponds to the Figure numbers in FIGS. 3A–3C. For example, the signal shown in FIG. 3A corresponds to sector 3A, and so forth. Beginning with FIG. 1A, the survey list is cleared and sector 3A is set as the first sector under consideration (blocks 10–14) as part of the Active Set. The searcher element begins a search for the multipath signals as shown in FIG. 3A and labeled as follows:

| Path label | time offset | Signal level | Sector |
| --- | --- | --- | --- |
| 300 | $t_{10}$ | $A_{10}$ | 3A |
| 302 | $t_{11}$ | $A_{11}$ | 3A |
| 304 | $t_{12}$ | $A_{12}$ | 3A |
| 306 | $t_{13}$ | $A_{13}$ | 3A |

Path 304 is the smallest of the four levels and is below the threshold level as indicated by threshold line 320. The searcher element finds three maxima (blocks 16–20). Therefore the final data added to the list of survey paths for this cycle is as follows:

| Path label | time offset | Signal level | Sector |
| --- | --- | --- | --- |
| 300 | $t_{10}$ | $A_{10}$ | 3A |
| 302 | $t_{11}$ | $A_{11}$ | 3A |
| 306 | $t_{13}$ | $A_{13}$ | 3A |

Sector 3B is set as the next sector under consideration (blocks 22 and 26). Two more entries are added to the list of survey path as follows (blocks 16–20):

| Path label | time offset | Signal level | Sector |
|---|---|---|---|
| 308 | $t_{14}$ | $A_{14}$ | 3B |
| 310 | $t_{15}$ | $A_{15}$ | 3B |

Sector 3C is set as the next sector under consideration (blocks 22 and 26). Two more entries are added to the list of survey paths as follows (blocks 16–20):

| Path label | time offset | Signal level | Sector |
|---|---|---|---|
| 312 | $t_{16}$ | $A_{16}$ | 3C |
| 314 | $t_{17}$ | $A_{17}$ | 3C |

Thus the list of survey paths is complete and the flow continues to FIG. 1B.

FIG. 1B begins by setting the path of demodulation element 1 to be the first path under consideration. Because demodulation path 1 is locked, the demodulation path is matched to a survey path (block 34–36). Suppose in this example that $t_1$ is approximately equal to $t_{10}$ and thus demodulation path 1 matches to survey path 300. Because demodulation path 1 is the first demodulation path to match survey path 300, the process continues for the next demodulation path (blocks 38 and 46).

Demodulation path 2 is set as the demodulation path under consideration (block 48). Because demodulation path 2 is unlocked, demodulation path 2 is labeled free (blocks 34 and 50). The process continues for the next demodulation path (block 46).

Demodulation path 3 is set as the demodulation path under consideration (block 48). Because demodulation path 3 is locked, the demodulation path is matched to a survey path (block 34–36). Suppose in this example that $t_3$ is also approximately equal to $t_{10}$ and thus demodulation path 3 matches to survey path 300 as did demodulation path 1. Because demodulation path 3 is the second demodulation path to match survey path 300, the process compares the amplitude of the two paths (block 38 and 40). In this example suppose that $A_3 < A_1$ and therefore demodulation element 3 is labeled free (block 44). Because demodulation path 3 is the last demodulation path, the functions of FIG. 1B are complete and the flow continue to FIG. 1C with the following list of demodulation paths:

| Demod. Element | time offset | Signal level | Locked | Sector |
|---|---|---|---|---|
| 1 | $t_1 = t_{10}$ | $A_1$ | Y | 3A |
| FREE 2 | | | | |
| FREE 3 | | | | | and the following list of survey paths:

| Path Label | time offset | Signal level | Sector | Matched |
|---|---|---|---|---|
| 300 | $t_{10}$ | $A_{10}$ | 3A | Demod path 1 |
| 302 | $t_{11}$ | $A_{11}$ | 3A | |
| 306 | $t_{13}$ | $A_{13}$ | 3A | |
| 308 | $t_{14}$ | $A_{14}$ | 3B | |

-continued

| Path Label | time offset | Signal level | Sector | Matched |
|---|---|---|---|---|
| 310 | $t_{15}$ | $A_{15}$ | 3B | |
| 312 | $t_{16}$ | $A_{16}$ | 3C | |
| 314 | $t_{17}$ | $A_{17}$ | 3C | |

Assuming that $A_{14}$ is the strongest signal level, the method as shown in FIG. 1C begins by setting survey path 308 as the survey path "P" under consideration, 3B as the sector "S" containing that path (block 60) and "C" as the cell containing the path P. In this example, no demodulation element is assigned to sector 3B and demodulation element or finger 2 is free (blocks 62 and 64). Therefore demodulation element 2 is assigned to survey path 308 and the new list of demodulation paths is as follows:

| Demod. Element | time offset | Signal level | Locked | Sector |
|---|---|---|---|---|
| 1 | $t_1$ | $A_1$ | Y | 3A |
| 2 | $t_{14}$ | $A_{14}$ | Y | 3B |
| FREE 3 | | | | |

Assuming that $A_{11}$ is the next strongest signal level, survey path 302 is the next survey path under consideration and 3A is the sector containing that path (blocks 74 and 70). Because there is already a demodulation element assigned to sector 3A, survey path 310 is set as the next survey path under consideration and 3B as the sector containing that path (blocks 62, 74, and 70), assuming that $A_{15}$ is the next strongest signal level. This process continues through survey paths 300 and 306, assuming that $A_{10}$ and $A_{13}$ follow in order of signal strength. When survey path 314 is the path under consideration and 3C is the sector containing that path, previously free demodulation element 3 is assigned to survey path 314 (blocks 62, 64, and 72). Survey path 312 is set as the survey path under consideration (blocks 74 and 70) and because demodulation path 3 is assigned to sector 3C the functions of FIG. 1C are complete (block 62, and 74) and as the list of demodulation paths is as follows:

| Demod. Element | Time offset | Signal level | Locked | Sector |
|---|---|---|---|---|
| 1 | $t_1$ | $A_1$ | Y | 3A |
| 2 | $t_{14}$ | $A_{14}$ | Y | 3B |
| 3 | $t_{17}$ | $A_{17}$ | Y | 3C |

In this scenario, no demodulation element has been reassigned up to this point, so the flow continues to FIG. 1D for further path and sector diversity. Survey path 308 is again set as the survey path under consideration (block 98) because $A_{14}$ is the strongest signal level. Because survey path 308 is assigned to demodulation element 2, the process continues with survey path 302 as the survey path under consideration (blocks 108, 106, 104, and 100) because $A_{11}$ as discussed above is the next strongest signal path. Next, survey path assigned is 310 because $A_{15}$ is the next in line of strength. Then demodulation element 1 is reassigned to survey path 302. This assignment ends the process of this cycle. The survey path is cleared (block 12) for the next cycle and the list of demodulation paths is as follows:

| Demod. Element | Time offset | Signal level | Locked | Sector |
|---|---|---|---|---|
| 1 | $t_{11}$ | $A_{11}$ | Y | 3A |
| 2 | $t_{14}$ | $A_{14}$ | Y | 3B |
| 3 | $t_{17}$ | $A_{17}$ | Y | 3C |

Once all the fingers are assigned (block 108), we turn to maximizing the coverage for paths and sectors according to the above cell assignments. If there is only one demodulation element (1,2 or 3) that is demodulating a supplemental channel, the method and apparatus of the present invention insures that that demodulation element will not be removed from the supplemental channel (blocks 114, 116). Or, if a sector of the cell supports supplemental channels, and the finger F is weaker than the path P under consideration by 3 dB, then the method will reassign the finger F to the path P. In this manner, the method will maximize the strength of the demodulation elements demodulating supplemental channels.

The base station method is less complicated than the mobile station method. Unlike the mobile station, the BS having multiple sectors is not concerned with sector diversity because no analogous power control information is sent from the mobile station. The base station method focuses on assigning all available demodulation elements to the strongest paths while avoiding excessive re-assignments.

There are many obvious variations of the embodiments of this invention. The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for processing a signal comprising:

measuring a series of energy levels of said signal;

generating a series of electronic representations of said signal based on said series of energy levels;

searching said series of electronic representations for a set of forward link signals;

demodulating a sub-set of forward link signals that contains at least one forward link signal for each transmitter, said at least one forward link signal having a greater signal strength than a remaining set of all other forward link signals also associated with said transmitter; and matching said first set of instances of said signal with said second set of instances of said signal, and for assigning an un-assigned finger, if said un-assigned finger exists, to a particular instance of said signal from said second set of instances of said signal, said particular instance having a corresponding transmitter index that is different than every transmitter index from said first set instances of said of signal, said assigning being dependent on whether any finger is demodulating a supplemental channel to insure that at least one finger is assigned to a source that is transmitting on supplemental channels, if one exists.

2. The method of claim 1, wherein said method occurs during a high data rate call.

3. The method of claim 1, wherein the signal processing occurs during a code decision multiple access forward link transmission.

* * * * *